UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ORGANIC MERCURY COMPOUND.

1,001,829.  Specification of Letters Patent.  Patented Aug. 29, 1911.

No Drawing.    Application filed September 7, 1910.  Serial No. 580,858.

*To all whom it may concern:*

Be it known that I, MAX ENGELMANN, doctor of philosophy, chemist, citizen of the German Empire, residing at Elberfeld, Germany, have invented new and useful Improvements in Organic Mercury Compounds, of which the following is a specification.

My invention relates to the preparation of hitherto unknown easily soluble compounds derived from the ortho-oxy-mercuric compound of salicylic acid anhydrid (hydrargyrum salicylicum). In order to prepare these products the ortho-oxymercuric salicylic acid anhydrid (hydrargyrum salicylicum of the German *Pharmacopœia*) is treated with salts of imino compounds containing groups of an acid character; or the alkaline salts of the ortho-oxymercuric salicylic acid anhydrid are treated with imino compounds of the class defined or with their salts; or a mixture of the ortho-oxymercuric salicylic acid with the imino compounds is treated with alkali. The imino compounds may vary widely in their chemical constitution; the only conditions necessary being that they must contain in addition to an imido radical another group or groups imparting an acid character to the compound. Bodies belonging to this class are for instance, acid imids, such as succinic imid, of the formula:

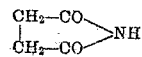

barbituric acids, such as possessing the following formula:

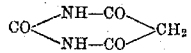

parabanic acid, of the formula

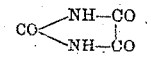

uracids, or their derivatives such as the methyluracil of the formula:

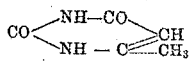

They show a more or less strong acid reaction to litmus and form salts showing alkaline reaction.

The new compounds thus obtained are whitish crystalline odorless compounds which are very easily soluble in water and insoluble in ether. They show a neutral reaction against litmus and are not decomposed by carbonic acid conducted into their solution. They have proved to be valuable antisyphilitica characterized by a mild action and as they are non-irritants and not corrosive they are highly valuable for internal application especially for subcutaneous injection. They can be used for the preparation of tablets from which aqueous solutions containing definite amounts of mercury can be prepared with the greatest ease. They contain the mercury so firmly combined that on adding a diluted solution of caustic alkali or a cold solution of ammonium sulfid no precipitate is obtained. A solution of from 0.1—0.2 grams may be used for one subcutaneous injection.

In carrying out my invention I can proceed as follows, the parts being by weight:— 340 parts of the ortho-oxymercuric compound of salicylic acid anhydrid (hydrargyrum salicylicum) are added to a solution of 206 parts of the sodium salt of diethylbarbituric acid in 2000 parts of water. After 12 hours the resulting solution is filtered and the filtrate is evaporated *in vacuo*. A whitish crystalline compound separates with almost theoretical yield. It can be purified by precipitation of its concentrated aqueous solution with alcohol. It is soluble in water yielding a neutral solution, insoluble in alcohol, ether, benzene, acetone and chloroform; or: a mixture of 350 parts of the ortho-oxy-mercuric compound of salicylic acid anhydrid (hydrargyrum salicylicum), 128 parts of diethylbarbituric acid and 2000 parts of normal NaOH is, while being shaken from time to time, allowed to stand for some hours at a moderate temperature. The solution is filtered and the filtrate concentrated *in vacuo* to a syrupy consistency. On addition of alcohol the new compound having probably the following formula:

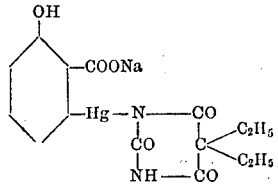

separates in crystals.

I claim:

1. The herein described new mercury compounds obtainable by reacting with alkali and an imino compound upon orthooxymercuric salicylic acid anhydrid, which new mercury compounds probably contain in their molecule the characteristic group:

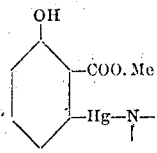

in which Me stands for metal, and are whitish powders easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

2. The herein described new specific mercury compound having probably the following formula:

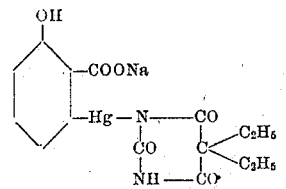

obtainable by reacting with alkali and diethylbarbituric acid upon orthooxymercuric salicylic acid anhydrid which is a whitish crystalline powder, easily soluble in water yielding a neutral solution, insoluble in alcohol, ether, benzene, acetone and chloroform, and containing the mercury so firmly combined that the aqueous solution does not give any precipitate on the addition of dilute caustic soda lye or a cold solution of ammonium sulfid; and being a valuable therapeutic compound, substantially as described.

In testimony whereof I have hereunto set my hand in the presence of two subscribing witnesses.

MAX ENGELMANN. [L. S.]

Witnesses:
 WALTER VONNEGUT,
 ALFRED HENKEL.